US006576680B2

(12) United States Patent
Ohshima et al.

(10) Patent No.: US 6,576,680 B2
(45) Date of Patent: Jun. 10, 2003

(54) RECLAIMED RUBBER AND PROCESS FOR PRODUCING THE SAME

(75) Inventors: Nobumitsu Ohshima, Tokyo (JP); Jingo Shirasaka, Tokyo (JP); Setsuo Akiyama, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/793,609

(22) Filed: Feb. 27, 2001

(65) Prior Publication Data

US 2001/0025060 A1 Sep. 27, 2001

(30) Foreign Application Priority Data

Feb. 29, 2000 (JP) ........................................ 2000-052781

(51) Int. Cl.$^7$ ................................................ C08J 11/04
(52) U.S. Cl. ........................................ 521/40.5; 521/41
(58) Field of Search ........................ 521/41, 44.5, 45.5; 264/912

(56) References Cited

U.S. PATENT DOCUMENTS 5,502,262 A    3/1996   Yamasaki et al. ........... 585/241

6,335,377 B1 *  1/2002   Izumoto et al. ............... 521/41

FOREIGN PATENT DOCUMENTS

| EP | 0 887 372 A1 | 12/1998 |
| EP | 0 997 252 A2 | 5/2000 |
| EP | 0 997 252 A3 | 5/2000 |
| JP | 2-18696 | 4/1990 |
| JP | 2-227724 | 9/1997 |
| JP | 9-227724 | 9/1997 |
| JP | 10-176001 | 6/1998 |

OTHER PUBLICATIONS

Fix , "Microwave Devulcanization of Rubber," *Elastomerics*, Jun. 1980, pp. 38–40.

* cited by examiner

Primary Examiner—Edward J. Cain
Assistant Examiner—Katarzyna Wyrozebski Lee
(74) Attorney, Agent, or Firm—Sughrue Mion, PLLC

(57) ABSTRACT

Reclaimed rubber which is obtained through devulcanization and has excellent physical properties as a vulcanized material, and a process for producing the same are provided. In the reclaimed rubber obtained by devulcanizing vulcanized rubber, the proportion of sol is 80% or higher, and the peak top molecular weight of sol as determined by gel permeation chromatography (GPC) is 100,000 or less.

6 Claims, No Drawings

RECLAIMED RUBBER AND PROCESS FOR PRODUCING THE SAME

BACKGROUND OF THE INVENTION

1. Field of the Invention

The present invention relates to, for reuse of vulcanized rubber from discarded tires and the like, reclaimed rubber obtainable through devulcanization, and to a process for producing the same. The reclaimed rubber is reused in tires or as a modifying agent for asphalt, etc.

2. Description of the Related Art

In the past, there have been proposed various processes for reclaiming vulcanized rubber from discarded tires and the like reusable for the same applications as unvulcanized rubber by breaking its cross-linking structure. For example, in the PAN process, which is widely employed in Japan as a process for reclaiming vulcanized rubber, devulcanization is effected under high pressured vapor for several hours. The reclamator process, which is a continuous reclaiming process using a uniaxial extruder is also known as a continuous devulcanization treatment utilizing shearing force. The latest known techniques for devulcanizing and reclaiming vulcanized rubber utilizing such sharing force and heat are disclosed in, for example, Japanese Patent Laid-Open Publication No. Hei 9-227724 and Japanese Patent Laid-Open Publication No. Hei 10-176001.

Other vulcanized rubber reclaiming processes that have been proposed include high-speed mixing devulcanization, microwave devulcanization (SiR, FiX; Elastomerics, 112(6), 38 (1980), Japanese Patent Publication No. Hei 2-18696), radiation devulcanization, and the like, some of which have been put into practice.

As described above, a variety of vulcanized rubber reclaiming processes have been proposed. However, reclaimed or recycled rubber obtained by such processes are not satisfactory in such physical properties of a vulcanized material as breaking strength, elongation, modulus, and the situation today is that it cannot be said sufficient studies have been made on reclaimed rubber in terms of physical properties of a vulcanized material.

SUMMARY OF THE INVENTION

Accordingly, it is an object of the present invention to provide reclaimed rubber which is obtained by devulcanization and has excellent physical properties as a vulcanized material, and a process for producing the same.

As a result of diligent investigation focused on the proportion of sol in reclaimed rubber for solving the problems mentioned above, the inventors of the present invention finally found that the aforementioned object is achieved by limiting the sol content of reclaimed rubber to within a specific range. The present invention was accomplished based on this finding.

That is, the present invention provides reclaimed rubber obtained through devulcanization of vulcanized rubber, wherein the proportion of sol in the reclaimed rubber is 80% or higher and that the peak top molecular weight of sol as measured by gel permeation chromatography (GPC) is 100,000 or less.

The proportion of sol is preferably 90% or higher, and the peak top molecular weight of sol is preferably 20,000 or less.

Moreover, the present invention provides a process for producing the reclaimed rubber described above, which comprises the step of devulcanizing vulcanized rubber using a biaxial extruder with its shaft rotation rate set at 150 to 300 rpm and the maximum cylinder temperature range adjusted to from 280 to 350° C.

The reclaimed rubber of the present invention functions more like oil, as the content of polymer gel, carbon gel, cross-linking substances, and the like is so extremely reduced that the molecular weight of sol decreases and the bonds between the main chains are broken. However, surprisingly it was found that incorporation of such reclaimed rubber into new rubber provides the resulting rubber with better physical properties. In contrast, in the prior art, as a result of the attempt to keep the molecular weight as unchanged as possible in order to ensure the physical properties of reclaimed rubber, untreated powder rubber remained therein to act as breaking nuclei being a cause of a decrease in strength.

DESCRIPTION OF THE PREFERRED EMBODIMENTS

Hereinafter, the embodiment of the present invention will be described concretely.

In the present invention, the vulcanized rubber to be reclaimed is a material obtained by mixing a polymer with sulfur or a sulfur compound to form various sulfur-crosslinking bonds such as monosulfide bonds, disulfide bonds, polysulfide bonds, and the like between carbon main chains for developing rubber elasticity.

As the polymer component, there may be mentioned natural rubber, butadiene rubber, isoprene rubber, butyl rubber, ethylene-propylene rubber, styrene-butadiene rubber, EPDM (ethylene-propylene-diene terpolymer), acrylic rubber, acrylonitrile-butadiene rubber, etc.

The vulcanized rubber is obtained from used materials such as rubber tires, weather strips, hoses, or from unnecessary end materials, defective moldings, and the like produced during molding.

In the present invention, the devulcanization of vulcanized rubber may be effected by, besides a chemical reagent method, a method of applying shearing stress, and it is not particularly restricted.

When applying shearing stress to discarded vulcanized rubber, it is preferred to use an apparatus that can heat the discarded vulcanized rubber while applying shearing stress, and examples of such apparatus are biaxial extruders and Banbury mixers. The devulcanization time is not particularly restricted either, and it may for example be 1 to 5 minutes.

In the reclaimed rubber of the present invention obtained in accordance with the devulcanization treatment described above, its sol content is 80% or higher, preferably 90% or higher. If the proportion of sol is lower than 80%, breaking nuclei tend to be formed and may cause degradation of the physical properties of the resulting reclaimed rubber. Moreover, in the reclaimed rubber of the present invention, the molecular weight of sol at peak top as determined by GPC is 100,000 or less, preferably 20,000 or less. If the molecular weight exceeds 100,000, good physical properties cannot be obtained. In addition, the treated material becomes too viscous, deteriorating the workability.

The reclaimed rubber of the present invention is suitably produced by devulcanizing vulcanized rubber using a biaxial extruder with its shaft rotation rate set at 150 to 300 rpm and the maximum range of its cylinder temperature adjusted to from 280 to 350° C. If the rotation rate of the screws of the biaxial extruder is less than 150 rpm, sufficient sol cannot be obtained, while a rotation rate exceeding 300 rpm is so severe for a treatment condition that, on the contrary, the performance of the resulting material is deteriorated. Usually, the biaxial extruder is controlled with its cylinder temperature divided into several blocks. Of these blocks, the temperature range with the greatest kneading effect is defined as the maximum temperature range. If a temperature within the maximum cylinder temperature range is lower than 280° C., sufficient sol cannot be obtained, while a temperature higher than 350° C. is so severe for a treatment condition that for example the decomposition of the material proceeds greatly, which on the contrary results in deterioration of the performance of the resulting material.

Incidentally, in the above-described process, the species of the vulcanized rubber to be treated or the treatment conditions other than those relating to the biaxial extruder are the same as in conventional processes, and there is no particular restriction.

EXAMPLES

Hereinafter, the present invention will be described based on the examples.

According to the biaxial extrusion method, powdered rubber of 30 mesh or finer obtained by pulverization of discarded tires and classification was subjected to devulcanization under the conditions specified in the following Table 1 (using a biaxial extruder PCM45 manufactured by Ikegai Tekko, Co., Ltd.) to prepare various samples (Examples 1 to 5, Comparative Examples 1, 2). Incidentally, the same vulcanized rubber was devulcanized by the PAN method to prepare a sample of the conventional rubber type.

In the table, the amount of gel was measured as follows.

First, approximately 0.5 g of reclaimed rubber was weighed out to four decimal places and the value thus obtained was recorded as (A). Thereafter, the weighed rubber was immersed in about 100 ml of toluene in a 100 ml Erlenmeyer flask and allowed to stand for a day and a night.

The toluene solution and the rubber were filtered with a 200 mesh stainless wire gauge (B) previously having been weighed out to four decimal places for separation. After the filtration, air drying was carried out for about 5 minutes (until the toluene filling its meshes was evaporated), and the toluene-impregnated rubber and the wire gauge were weighed. The value obtained was recorded as (C). After the weighing, the rubber was put in a vacuum drier together with the wire gauge and vacuum-dried at 70° C. for a day and a night. Then, the weight after the drying was measured again to four decimal places and recorded as (D). The values (A) to (D) were used to determine the gel content (%) and the degree of swell according to the following equations.

Gel content $(\%) = [(D)-(B)]/(A) \times 100$

Degree of swell $= [(C)-(D)]/[(D)-(B)] \times 100$

The toluene solution separated from the rubber by the filtration described above was diluted with a GPC developing solution and subjected to GPC measurement. Thereafter, the peak top molecular weight was determined utilizing a calibration curve drawn with a standard polystyrene sample.

Using the various reclaimed rubber samples thus obtained, rubber compositions for physical properties testing were prepared according to the blending recipe shown in Table 2 below.

TABLE 2

| Blending recipe | phr |
| --- | --- |
| SBR[1] | 100 |
| Reclaimed rubber | 30 |
| Carbon black | 50 |
| Aroma oil | 10 |
| Stearic acid | 2 |
| Antioxidant 6c[2] | 1 |
| Zinc oxide | 3 |
| Vulcanization accelerator DM[3] | 1 |
| Vulcanization accelerator DPG[4] | 0.5 |
| Sulfur | 2.0 |

[1]#1500 (Japan Synthetic Rubber Co., Ltd.)
[2]N-(1,3-dimethyl-butyl)-N'-phenyl-p-phenylenediamine
[3]dibenzothiazylsulfide
[4]diphenylguanidine

TABLE 1

| | | Comparative Example 1 | Example 1 | Example 2 | Comparative Example 2 | Example 3 | Example 4 | Example 5 |
| --- | --- | --- | --- | --- | --- | --- | --- | --- |
| Screw rotation rate (rpm) | | 200 | 200 | 200 | 200 | 200 | 200 | 200 |
| Feeder charge (kg/h) | | 0.5 | 0.5 | 1.5 | 1.5 | 0.5 | 1.0 | 1.0 |
| Barrel temperature (° C.) | C1 | 250 | 300 | 300 | 280 | 280 | 300 | 330 |
| | C2 | 250 | 300 | 300 | 280 | 280 | 300 | 330 |
| | C3 | 250 | 300 | 300 | 280 | 280 | 300 | 330 |
| | C4 | 250 | 250 | 250 | 250 | 250 | 300 | 330 |
| | C5 | 180 | 180 | 180 | 180 | 180 | 250 | 300 |
| | Head | 180 | 180 | 180 | 180 | 180 | 180 | 250 |
| | Die | 160 | 160 | 160 | 160 | 160 | 160 | 200 |
| Shape | | String-like | Paste-like | Paste-like | String-like | Paste-like | Paste-like | Paste-like |
| Sol (%) | | 48.5 | 91.1 | 96.7 | 56.8 | 84 | 96.8 | 85 |
| Degree of swell | | 4.5 | 0.4 | 3.5 | 2.4 | 1.1 | 1.3 | 3.2 |
| Molecular weight of sol | | 17000 | 3000 | 5000 | 9000 | 6000 | 4000 | 5000 |

The rubber compositions for physical properties testing prepared according to the blending recipe shown above was, after having been vulcanized at 160° C. for 13 minutes, subjected to the following various physical properties-tests for their evaluation.

1) Hardness (Hd)

Hardness was measured according to JIS K6301 (JIS spring-type A).

2) Elongation at break (EB), tensile strength at break (TB), and modulus (M100, M300).

These were determined at a tensile rate of 500 mm/min. and 24° C. according to JIS K6301. Incidentally, M100 is a modulus at 100% elongation, and M300 is a modulus at 300% elongation. The obtained results are shown in Table 3 below.

TABLE 3

|  | Comparative Example 1 | Example 1 | Example 2 | Comparative Example 2 | Example 3 | Example 4 | Example 5 | Conventional Example |
| --- | --- | --- | --- | --- | --- | --- | --- | --- |
| Hardness (Hd) | 60 | 60 | 59 | 61 | 60 | 59 | 60 | 62 |
| EB (%) | 506 | 599 | 630 | 555 | 572 | 610 | 609 | 471 |
| TB (MPa) | 18.65 | 20.17 | 19.4 | 18.75 | 18.88 | 19.13 | 19.33 | 17.6 |
| M100 (MPa) | 1.91 | 1.83 | 1.72 | 1.95 | 1.83 | 1.78 | 1.84 | 2.19 |
| M300 (MPa) | 10.06 | 8.72 | 7.94 | 9.07 | 8.65 | 8.08 | 12.28 | 10.27 |

As is obvious from Table 3 above, without exception, the reclaimed rubber of the examples exhibited better physical properties as compared to the reclaimed rubber of the comparative examples and the conventional example.

As described above, the reclaimed rubber of the present invention is excellent in such physical properties as a vulcanized material as breaking strength, elongation, modulus, etc., and is favorably reusable.

What is claimed is:

1. Reclaimed rubber obtained by devulcanization of vulcanized rubber, wherein the proportion of sol in the reclaimed rubber is higher than 80% and the peak top molecular weight of the sol as determined by gel permeation chromatography (GPC) is 100,000 or less.

2. The reclaimed rubber according to claim 1, wherein the proportion of the sol is 90% or higher.

3. The reclaimed rubber according to claim 1 or 2, wherein the peak top molecular weight of the sol in the reclaimed rubber is 20,000 or less.

4. A process for producing reclaimed rubber, the proportion of sol in the reclaimed rubber being higher than 80% and the peak top molecular weight of the sol as determined by gel permeation chromatography (GPC) being 100,000 or less, which comprises the step of devulcanizing vulcanized rubber using a biaxial extruder with its shaft rotation rate set at 150 to 300 rpm and its maximum cylinder temperature range adjusted to from 280 to 350° C.

5. The process for producing reclaimed rubber according to claim 4, wherein the proportion of sol is 90% or higher.

6. The process for producing reclaimed rubber according to claim 4 or 5, wherein the peak top molecular weight of the sol in the reclaimed rubber is 20,000 or less.

\* \* \* \* \*